United States Patent
Leiphart et al.

(10) Patent No.: US 6,981,578 B2
(45) Date of Patent: Jan. 3, 2006

(54) NON-PRESSURIZED MONOTUBE SHOCK ABSORBER

(76) Inventors: Troy Leiphart, 30777 Highway 40, New Auburn, WI (US) 54757; James D. Hansen, W. 9362 Woodlawn Dr., Holcombe, WI (US) 54745

( * ) Notice: Subject to any disclaimer, the term of this patent is extended or adjusted under 35 U.S.C. 154(b) by 0 days.

(21) Appl. No.: 10/893,041

(22) Filed: Jul. 16, 2004

(65) Prior Publication Data

US 2005/0023093 A1    Feb. 3, 2005

Related U.S. Application Data

(60) Provisional application No. 60/491,303, filed on Jul. 31, 2003.

(51) Int. Cl.
*F16F 9/34*    (2006.01)
*F16K 15/16*   (2006.01)

(52) U.S. Cl. .................. 188/322.14; 188/281; 137/855

(58) Field of Classification Search ............... 188/281, 188/283, 297, 298, 313, 316, 317, 322.14, 188/322.13, 322.15; 267/64.11, 64.15, 64.16, 267/64.23, 64.27; 137/855, 859
See application file for complete search history.

(56) References Cited

U.S. PATENT DOCUMENTS

| | | | |
|---|---|---|---|
| 1,783,599 A * | 12/1930 | Blake .......................... | 267/223 |
| 2,781,869 A * | 2/1957 | Boehm et al. ............... | 188/269 |
| 2,856,035 A * | 10/1958 | Etienne ...................... | 188/269 |
| 3,070,191 A * | 12/1962 | Stanislas ..................... | 188/317 |
| 3,690,425 A | 9/1972 | Willich et al. | |
| 4,290,511 A | 9/1981 | de Baan et al. | |
| 4,452,436 A | 6/1984 | Gute | |
| 4,638,896 A | 1/1987 | Poyser | |
| 5,085,300 A * | 2/1992 | Kato et al. ............... | 188/282.6 |
| 5,261,448 A * | 11/1993 | Furuya et al. ........... | 137/513.5 |
| 5,437,437 A * | 8/1995 | Takano et al. ......... | 267/140.14 |
| 5,570,762 A | 11/1996 | Jentsch et al. | |
| 5,678,808 A | 10/1997 | Claude et al. | |
| 5,706,920 A | 1/1998 | Pees et al. | |
| 5,819,799 A * | 10/1998 | O'Dell .................. | 137/625.17 |
| 5,984,060 A | 11/1999 | Clark et al. | |
| 6,161,662 A | 12/2000 | Johnston et al. | |
| 6,196,528 B1 * | 3/2001 | Shtarkman et al. .... | 267/140.14 |
| 6,247,563 B1 | 6/2001 | De Carbon et al. | |
| 6,311,962 B1 | 11/2001 | Marking | |
| 6,318,523 B1 | 11/2001 | Moradmand et al. | |
| 6,390,258 B1 | 5/2002 | Hofmann et al. | |

FOREIGN PATENT DOCUMENTS

JP        5338868 A    *    4/1978

* cited by examiner

*Primary Examiner*—Melody M. Burch
(74) *Attorney, Agent, or Firm*—Tipton L. Randall

(57) ABSTRACT

A shock absorber of a monotube type utilizes a mechanically fixed base valve to regulate oil flow between the compression and compensation chambers, and a compressible bladder in the compensation chamber to allow volume compensation, which, together, eliminate the need for pressurized gas and a floating piston found in conventionally known monotube dampers.

15 Claims, 7 Drawing Sheets

NON-PRESSURIZED MONOTUBE SHOCK ABSORBER

CROSS-REFERENCE TO RELATED APPLICATIONS, IF ANY

This application claims the benefit under 35 U.S.C. §119 (e) of co-pending provisional application Ser. No. 60/491, 303, filed 31 Jul. 2003. Application Ser. No. 60/491,303 is hereby incorporated by reference.

STATEMENT REGARDING FEDERALLY SPONSORED RESEARCH OR DEVELOPMENT

Not applicable

REFERENCE TO A MICROFICHE APPENDIX, IF ANY

Not applicable

BACKGROUND OF THE INVENTION

1. Field of the Invention

The present invention relates to shock absorbers (hydraulic dampers) for the suspension system of a motor vehicle or other mechanical device. In particular, the present invention relates to hydraulic dampers of the single or monotube type.

2. Background Information

The state of the art includes various shock absorbers or hydraulic dampers used mainly for the suspension of a wide variety of motor vehicles. This technology is believed to have significant limitations and shortcomings, including, but not limited to, that the shock absorbers or hydraulic dampers presently in use operate at elevated pressure that causes air to mix with the hydraulic fluid commonly used within these damper devices.

For this and other reasons, a need exists for the present invention. This invention provides a non-pressurized shock absorber that has an extended service life and is easily rebuilt. The non-pressurized shock absorber device of the present invention is believed to fulfill the need and to constitute an improvement over the background technology.

Referring now to FIGS. 1 and 2, known hydraulic dampers of the monotube type are comprised of a tube (body) with a rod guide fixed at one end and a base fixed at the other end of the tube. A piston and rod assembly pass slidingly and sealably through the tube and rod guide, respectively. A floating piston is located slidingly and sealably in the tube between the primary piston and the base. The primary piston divides the tube into two chambers, a rebound chamber to the rod guide side and a compression chamber to the floating piston side. Both chambers are typically filled with hydraulic fluid (oil), which provides lubrication and viscous resistance to linear movement. The primary piston includes valving, which permits fluid to pass through the piston at preset or adjustable flow rates based on the pressure differential between the rebound and compression chambers. The floating piston divides the tube into a third chamber at the base side, which is typically filled with a gas under high pressure. This gas allows for volumetric compensation, as the rod slides in and out of the tube, and provides pressure to force the oil through the primary piston during the compression stroke. A mounting member is secured to the base member, and another mounting member is secured to the exterior end of the rod member. The mounting members fasten the monotube shock absorber device in a operable position on a motor vehicle.

In the arrangement shown in FIGS. 1 and 2, the gas pressure must be sufficient to resist the pressure created in the compression chamber during the compression stroke, or the oil in the rebound chamber will cavitate, which diminishes the damping effect at the start of the rebound stroke. The internal pressure created by the pressurized gas in the third chamber acts on the cross-sectional area of the rod to cause this type of damper to also act as a pneumatic spring, which has a progressive rate as the damper is compressed and the compensation chamber volume is reduced. This spring effect is increased further as the damper's temperature rises. This progressive and temperature dependent spring effect is usually unwanted in a suspension system. Also, as the seal on the floating piston degrades from wear over time, the gas infiltrates into the other chambers, degrading the damping performance of the damper and shortening its useful life.

All United States patents and patent applications, and all other published documents mentioned anywhere in this application are incorporated by reference in their entirety. Some examples of hydraulic damper devices for which patents have been granted include the following.

Willich et al., in U.S. Pat. No. 3,690,425, describe a hydraulically dampened vehicular suspension device that includes a self-contained damper unit which incorporates a shock absorber and which can be easily fitted into a pipe carrying a wheel-axle journal at its lower end. In order to replace the damper unit in the outer pipe, it is only necessary to unscrew a lock nut and uncouple the damping cylinder of the inserted unit from the vehicle chassis. The device may also include a means for cooling the damping cylinder in use.

In U.S. Pat. No. 4,290,511, de Baan et al. disclose a load-carrying, shock absorbing strut comprising an outer tube for carrying a wheel axle journal. Slidably accommodated in the tube is a shock absorber cylinder which is connected with the chassis frame. A downwardly emerging piston rod of the cylinder is fastened to the bottom of the outer tube. Between the shock absorber cylinder and the outer tube there is provided a lubricant annular chamber of constant volume which is closed off above and below by upper and lower guide and sealing rings arranged on the outer tube. A sealing ring is arranged above each guide ring with axially limited play and comprises lubricant-sealing felt rings. To effect good dirt-deflecting action there is present above the upper sealing ring a dirt-deflecting ring which has the dual function of limiting the sealing ring axial play, as well as removing dirt from the shock absorber cylinder.

Gute, in U.S. Pat. No. 4,452,436, describes a single tube vehicle suspension strut with a built-in shock absorber in which the piston rod is formed from tubing that provides a reservoir for shock absorber fluids. The strut further features this type of piston valving with the deflecting spring discs and cooperating metering pin construction, which can readily reduce high pressure build-up and which can be adjusted to provide ride and level control. This unit can be used to provide a leveling feature with the gas spring in the piston tube operatively connected to suitable controls for pressurized gas and exhaust.

In U.S. Pat. No. 4,638,896, Poyser discloses a shock absorber of monotube or twin-tube configuration, where the piston within the shock absorber includes an electromagnetically operable bypass valve, with the electromagnetically operable valve being controlled remotely from the outside of the shock absorber via an electrical connection which extends along the piston rod. In a twin tube configuration according to the present invention, the foot valve assembly also includes an electromagnetically operable bypass valve which is remotely controlled from the outside of the shock absorber via an electrical connection. These electrical connections do not affect the overall design of the shock absorber and can thus be easily included in a vehicle design. Further, these electrical connections can be connected to a microprocessor so that the shock absorber valves are controlled by the microprocessor dependent upon the values of certain parameters, e.g., speed or load, fed to the microprocessor from appropriate sensors.

Jentsch et al., in U.S. Pat. No. 5,570,762, describe a hydraulic damper of the monotube type, in which the floating piston includes a first valve allowing fluid flow from the compression chamber to the compensation chamber when fluid pressure in the compression chamber exceeds that in the compensation chamber by a predetermined amount and a second valve allowing fluid flow from the compensation chamber to the compression chamber when fluid pressure in the compensation chamber exceeds that in the compression chamber by a predetermined amount. The device provides improved high speed damping.

In U.S. Pat. No. 5,678,808, Claude et al. disclose a gas charged monotube strut that carries the accumulator outside the damper's cylinder tube and within the strut mount. A substantially direct flow path is provided between the damper and the accumulator through the damper's piston rod. Air to oil separation is maintained by a gas cup, and a low profile of packaging is provided.

Pees et al., in U.S. Pat. No. 5,706,920, describe a suspension damper of the monotube, gas charged, shock type that includes mating piston and rod guide assemblies and mating piston and gas cup assemblies, where the extension and compression travel of the damper is maximized. The piston includes an annular skirt with a lower rebound cutoff element. The rod guide assembly includes twin, spaced apart, bushing assemblies providing lateral support to the piston rod, a lower annular leg and an upper rebound cutoff element. When the damper is in a fully extended position, the lower annular leg is received within the upper rebound cutoff element, and the upper rebound cutoff element is received within the annular skirt of the piston assembly.

In U.S. Pat. No. 5,984,060 Clark et al. disclose a monotube strut assembly that includes a housing tube with a piston assembly fixed relative to the housing tube by a piston rod. A damper body tube is reciprocally carried in the housing tube and is slidably engaged with the piston assembly. A bearing sleeve is fixed in position within the housing tube, and seals are carried at both first and second ends of the bearing sleeve. A bearing is positioned adjacent each of the first and second ends of the bearing sleeve and the bearings slidably support the damper body tube. A quantity of oil is carried between the damper body tube and the bearing sleeve, providing lubrication between the bearings and the damper body tube.

Johnston et al., in U.S. Pat. No. 6,161,662, describe a monotube suspension damper that including a cylinder tube having a fluid chamber and a gas chamber, and a piston dividing the fluid chamber into a compression chamber and a rebound chamber. Also present is a primary fluid flow path across the piston that includes flow control valves which throttle fluid flow, a secondary fluid flow path across the piston parallel to the primary flow path that includes flow control valves which throttle fluid flow, and a tubular connecting rod on the cylinder tube connected to the piston. A valve spool is supported on the piston for linear translation between closed and open positions blocking and unblocking the secondary flow path. A control rod inside of the connecting rod is disposed between the valve spool and a flexible diaphragm exposed to pneumatic pressure in an expandable load leveling chamber between sprung and unsprung masses of the motor vehicle. As the pneumatic pressure in the expandable chamber varies, the control rod transfers flexure of the diaphragm to the valve spool to close the secondary flow path and increase the stiffness of the suspension damper as pneumatic pressure increases and to open the secondary flow path and decrease the stiffness of the suspension damper as pneumatic pressure decreases.

In U.S. Pat. No. 6,247,563, De Carbon et al. disclose a piston with a valve for a hydraulic damper tube. The piston comprises a piston body having a fluid passage interacting with a floating valve element for controlling in both directions the amount of fluid flowing through the passage. The floating valve element includes a spring washer, the deflection of which in the free state is between approximately 0.1 times and approximately 2 times the thickness of the washer.

Marking, in U.S. Pat. No. 6,311,962, describes a gas spring shock absorber that includes a damping fluid cylinder telescopically housed within a gas cylinder. A shaft connects a sealed, outer end of the gas cylinder with a vented piston movably mounted within damping fluid cylinder. The shaft passes through a sealed inner end of damping fluid cylinder so that a sliding seal located between gas cylinder and damping fluid cylinder creates a sealed variable-volume gas cylinder between the cylinders.

In U.S. Pat. No. 6,318,523, Moradmand et al. disclose a piston valve assembly for regulating the flow of fluid through a monotube fluid vehicle damper. The assembly includes a piston rod and a piston end having opposing first and second surfaces secured to the piston rod by a connector. A first outer annular seat is spaced radially from the piston rod and extends from the first surface. At least one first fluid passageway connects a first opening between the piston rod and the first outer annular seat and the second surface for providing fluid communication there between. A first blow-off valve has a hollow cylindrical portion, with a first flange extending transversely from an end thereof and with the first flange adjacent to the first outer annular seat when the first blow-off valve is in a closed position. The piston rod and connector secure the blow-off valve to the piston end. The first blow-off valve is movable to an open position away from the first surface. A first low speed bypass valve is interposed between the at least one first passageway and the second surface for permitting fluid to exit the at least one first fluid passageway past the first blow-off valve when the first blow-off valve is in the closed position. A first helical spring engages the first blow-off valve for biasing the first blow-off valve to the closed position. The blow-off valve provides increased digressive performance during operation of the damper.

Hofmann et al., in U.S. Pat. No. 6,390,258, describe a guide assembly for a rod of a motor vehicle strut comprising a rod guide, a seal cover, and a retainer. The seal cover engages the rod guide, and defines an area there between. The retainer is engaged with the seal cover. A first O-ring is disposed between the seal cover and the rod guide, and a second O-ring is disposed between the rod guide and the retainer.

Applicant has devised a shock absorber of a monotube type which operates at normal atmospheric pressure. The monotube shock absorber of the present invention provides a variety of advantages over the monotube shock absorbers presently on the market.

SUMMARY OF THE INVENTION

The present invention eliminates the need for gas pressurization in a monotube hydraulic damper in an effort to improve its performance characteristics, lengthen its useful life, and reduce its cost of manufacture.

The monotube hydraulic damper of the present invention is comprised of a tube (body) with a rod guide member fixed at one end and a base member fixed at the other end of the tube. A piston and rod assembly, which includes a primary piston member and a rod member, pass slidingly and sealably through the tube and rod guide, respectively. A base valve member is mechanically fixed at one end of the tube between the primary piston member and the base member. In one embodiment, a compressible bladder member is located in the compensation chamber. The primary piston member divides the tube into two chambers, a rebound chamber to the rod guide side and a compression chamber to the base valve side. The chambers are filled with hydraulic fluid (oil), which provides lubrication and viscous resistance. The primary piston member includes valving, which permits oil to pass through the piston member at preset or adjustable flow rates based on the pressure differential between the rebound chamber and the compression chamber. The base valve member divides the tube into a third compensation chamber to the base side, which contains the compressible bladder member.

In this embodiment of the invention, the bladder member allows for volumetric compensation as the rod member slides in and out of the tube. The base valve member provides a preset or adjustable amount of resistance to oil flow into the compensation chamber, thus also forcing oil through the piston member during the compression stroke. The base valve member also provides minimal resistance to oil flow from the compression chamber, thus replenishing the compression chamber during the rebound stroke. A mounting member is secured to the base member, and another mounting member is secured to the exterior end of the rod member. The mounting members fasten the monotube shock absorber device in a operable position on a motor vehicle.

In an alternate embodiment, the bladder member is replaced by a flexible diaphragm located between the base valve member and the tube base member that divides the tube into a forth chamber at the base side. This forth chamber is filled with air at essentially atmospheric pressure and allows for volumetric compensation as the rod member slides in and out of the tube.

In these arrangements, there is no need for a floating piston and pressurized gas, because the base valve member provides the appropriate resistance to oil flow into the third chamber, so that cavitation is avoided in the rebound chamber during the damper's compression stroke. The base valve member also allows oil to be replenished into the compression chamber during the damper's rebound stroke. With the elimination of the floating piston and its wearable seal, the service life of the damper of the present invention can be expected to be greater. Also, since there is no sliding seal between gas and oil, the internal surface of the tube (body) may have a rougher surface finish, which reduces the cost of manufacture.

DESCRIPTION OF THE EMBODIMENTS

Nomenclature
10 Monotube Hydraulic Damper Device
15 Tube Body
20 Rod Guide Member
25 Base Member of Tube Body
30 Primary Piston Member
35 Rod Member
40 Base Valve Member
40a Deflective Disk Assembly
45 Compressible Bladder Member
50 Rebound Chamber of Tube Body
55 Compression Chamber of Tube Body
60 Valving of Primary Piston Member
65 Compensation Chamber of Tube Body
70 Mounting Members
75 Elastomeric Diaphragm Member
80 Fourth Chamber of Tube Body
85 Closed Cell Foam Bladder Member
90 Replenishing Valve Member
92 Flapper Portion of Replenishing Valve Member
100 Valve Plate Member
102 Metering Passages in Plate Member
104 Replenishing Passage in Plate Member
110 Metering Valve Member
112 Replenishing Passage in Metering Valve Member Construction The present invention is a non-pressurized monotube hydraulic damper device. The device includes a hollow, cylindrical tube body having a first end and a second end, with a rod guide member fixed at the first end of the tube body and a base member fixed at the second end of the tube body. A piston and rod assembly includes a linear rod member passing slidingly and sealably through the rod guide member and secured at one end to a piston member interior the tube body. The piston member divides the tube body into a rebound chamber adjacent the rod guide member and a compression chamber adjacent the base member. The piston member includes valving for fluid flow between the compression chamber and the rebound chamber. A base valve member is mechanically fixed in the tube body between the piston member and the base member. The base valve member divides the compression chamber into a third chamber adjacent the base member with the base valve member regulating fluid flow between the compression chamber and the third chamber. A compressible member is present within the third chamber. The compressible member exerts essentially atmospheric pressure in an expanded condition. A first mounting member is secured to the base member exterior the tube member and a second mounting member is secured to an end of the rod member exterior the tube member.

Figure 1:
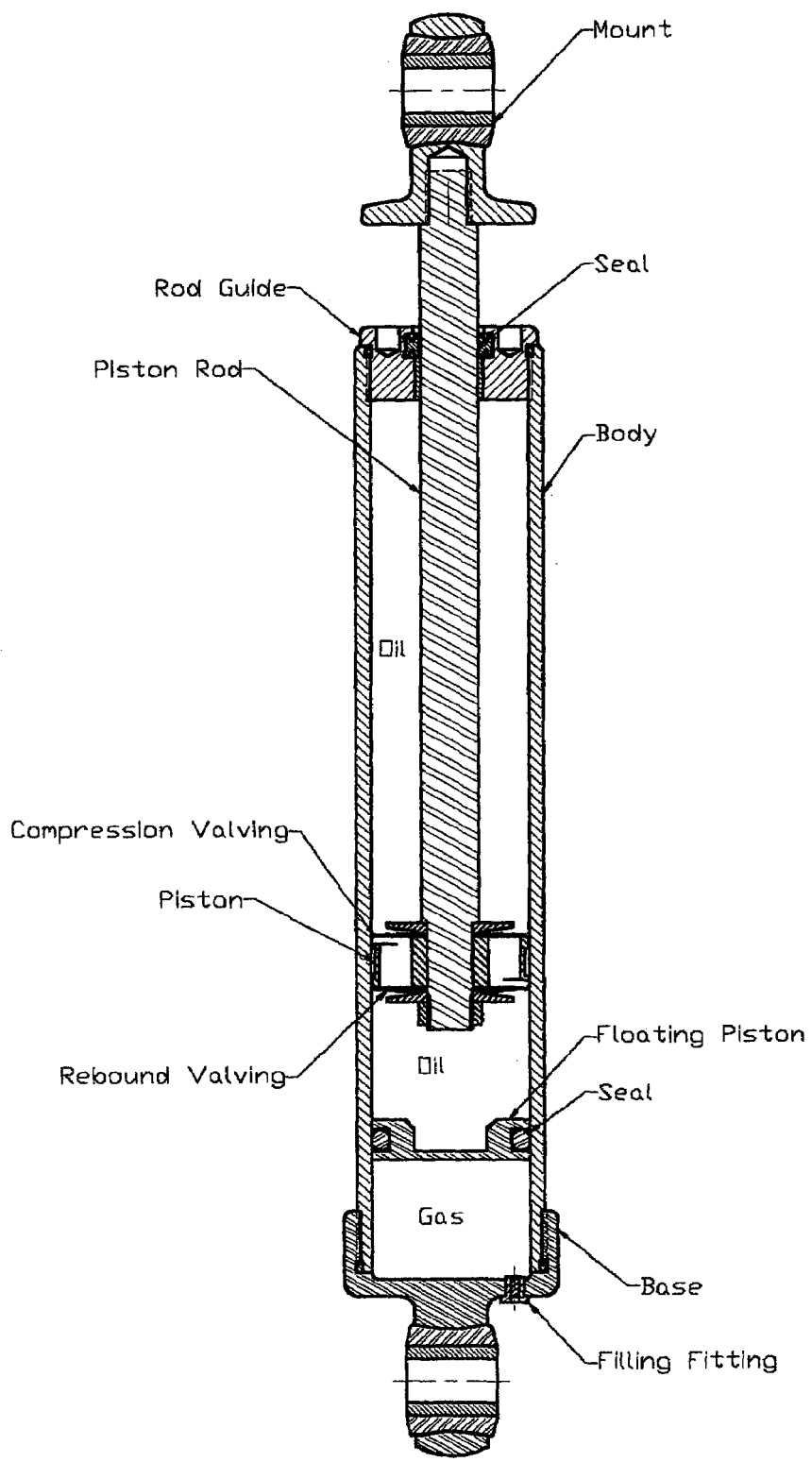
FIG. 1 is a cross sectional view of one prior art embodiment of a pressurize monotube shock absorber.
Figure 2:
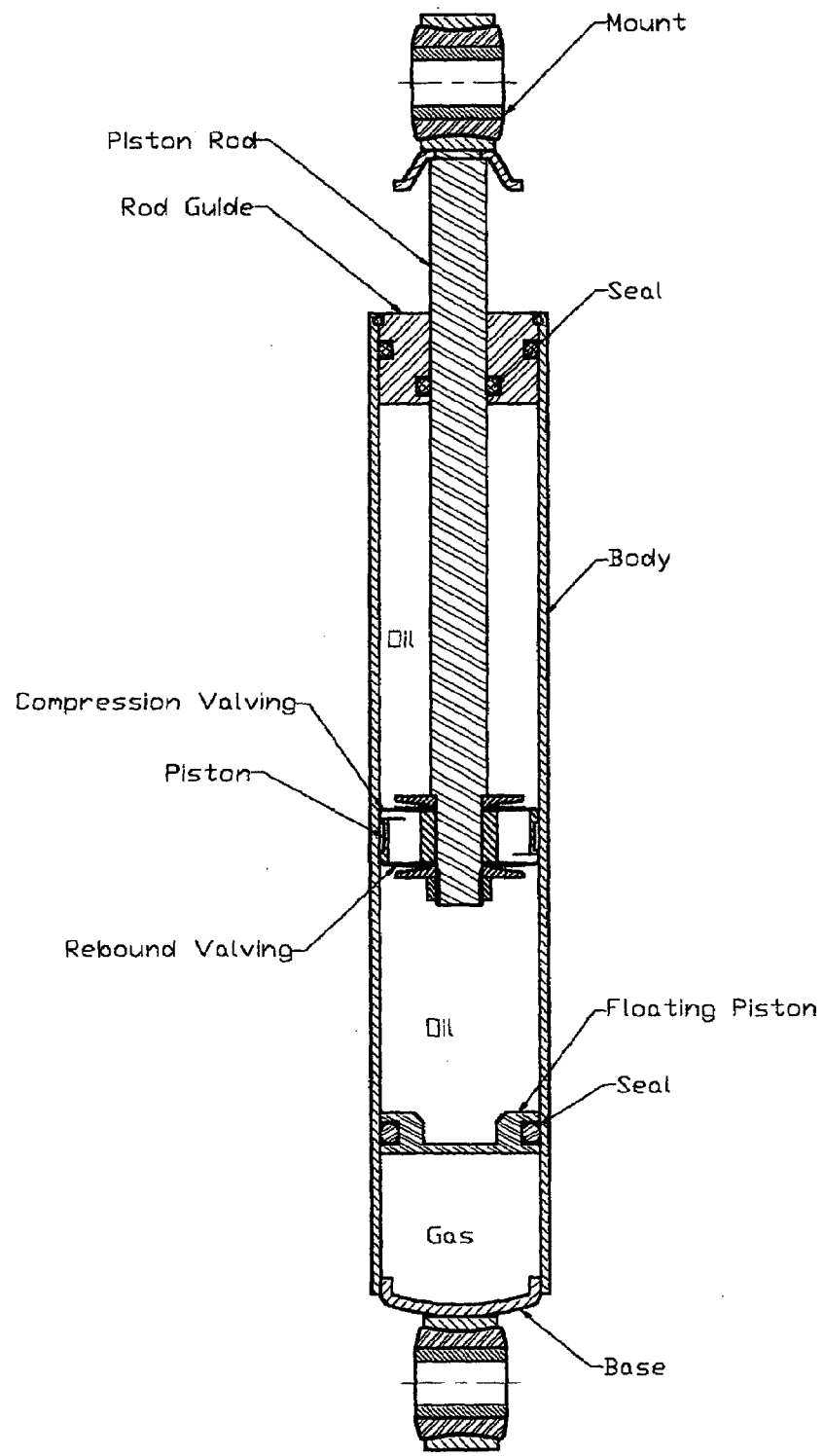
FIG. 2 is a cross sectional view of another prior art embodiment of a pressurize monotube shock absorber.
Figure 3:
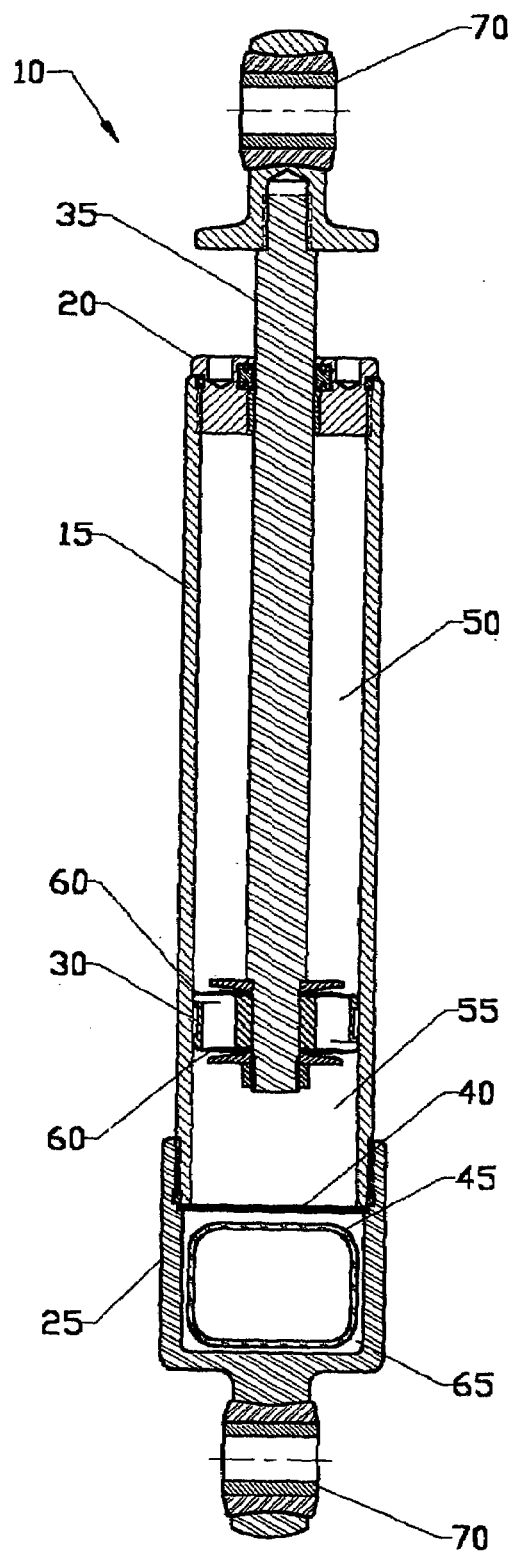
FIG. 3 is a cross sectional view of one embodiment of the non-pressurized monotube shock absorber assembly of the present invention.
Figure 4:
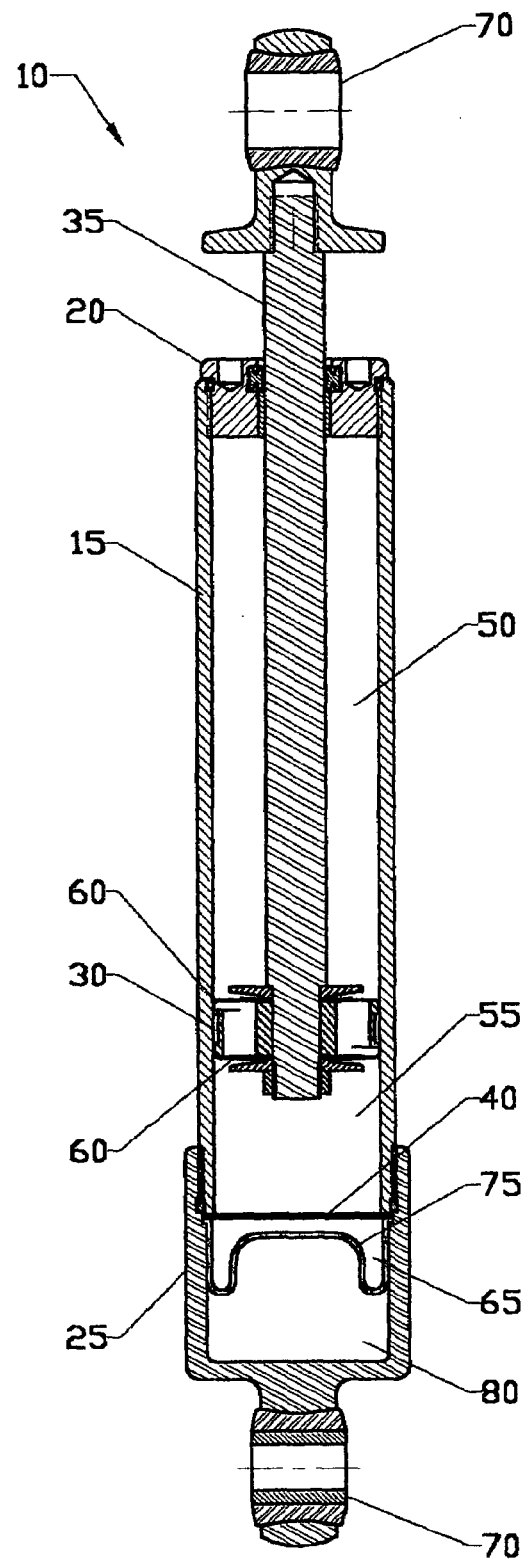
FIG. 4 is a cross sectional view of an alternative embodiment of the non-pressurized monotube shock absorber assembly of the present invention.
Figure 5:
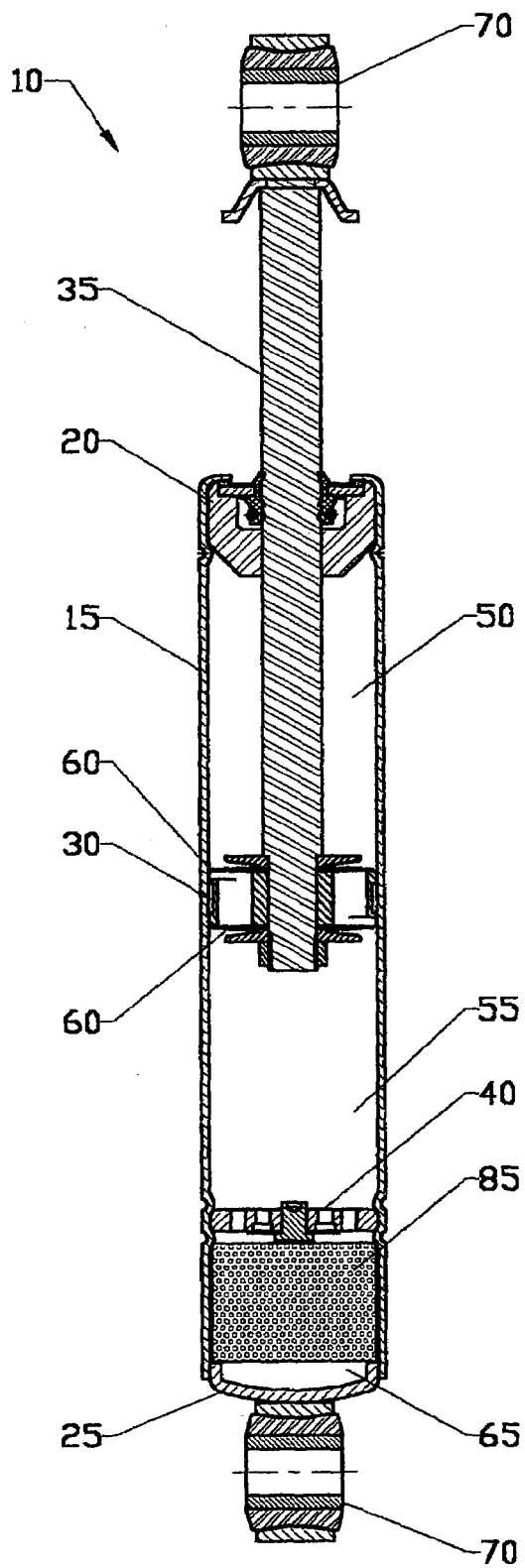
FIG. 5 is a cross sectional view of another alternative embodiment of the non-pressurized monotube shock absorber assembly of the present invention.

Referring now to FIGS. 3–5, several embodiment of the non-pressurized monotube hydraulic damper 10 are shown. The monotube hydraulic damper 10 of the present invention is comprised of a tube (body) 15, with a rod guide member 20 fixed at one end and a base member 25 fixed at the other end of the tube 15. A piston and rod assembly, including a primary piston member 30 and a rod member 35, with the rod member 35 passes slidingly and sealably through the tube 15 and rod guide 20. A base valve member 40 is mechanically fixed in the tube 15 between the primary piston member 30 and the base member 25. In one embodiment, a compressible bladder member 45 is located in the compensation chamber 55. The primary piston member 30 divides the tube 15 into two chambers, a rebound chamber 50 to the rod guide side and a compression chamber 55 to the base valve side. The chambers are filled with hydraulic fluid (oil), which provides lubrication and viscous resistance. The primary piston member 30 includes valving 60, which permits oil to pass through the piston member 30 at preset or adjustable flow rates based on the pressure differential between the rebound chamber 50 and the compression chamber 55. The base valve member 40 divides the tube 15 into a third compensation chamber 65 at the base side, which contains the compressible bladder member 45, as shown in FIG. 3. The compressible bladder member 45 is filled with air at essentially atmospheric pressure when in an expanded condition. Preferably, the expanded condition volume of the compressible bladder member 45 is about twice the volume of fluid displaced by the rod member 35 over the full compression stroke of the piston and rod assembly. This relationship provides highly acceptable performance for the monotube hydraulic damper 10.

In this embodiment of the invention, the bladder member 45 allows for volumetric compensation as the rod member 35 slides in and out of the tube 15. The base valve member 40 provides a preset or adjustable amount of resistance to oil flow into the compensation chamber 65, thus also forcing oil through the piston member 30 during the compression stroke. The base valve member 40 also provides minimal resistance to oil flow from the compensation chamber 65, thus replenishing the compression chamber 55 during the rebound stroke. A mounting member 70 is secured to the base member 25 and another mounting member 70 is secured to the exterior end of the rod member 35. The mounting members 70 fasten the monotube shock absorber device 10 in a operable position on a motor vehicle.

In an alternate embodiment, shown in FIG. 4, the bladder member 45 is replaced by a flexible diaphragm member 75 located between the base valve member 40 and the base member 25. The flexible diaphragm member 75 divides the tube 15 into a forth chamber 80 at the base side. This forth chamber 80 is filled with air at essentially atmospheric pressure when in an expanded condition and allows for volumetric compensation as the rod member 35 slides in and out of the tube 15. Preferably, the expanded condition volume of air retained by the diaphragm member 75 in the forth chamber 80 is about twice the volume of fluid displaced by the rod member 35 over the full compression stroke of the piston and rod assembly. This relationship provides highly acceptable performance for the monotube hydraulic damper 10.

In yet another alternate embodiment, shown in FIG. 5, the bladder member 45 is replaced by a closed cell foam bladder member 85 located between the base valve member 40 and the base member 25. The closed cell foam bladder member 85, positioned in the compensation chamber 65, likewise provides for volumetric compensation as the rod member 35 slides in and out of the tube 15 during operation of the monotube hydraulic damper 10. Preferably, the expanded condition volume of the closed cell foam bladder member 85 is about twice the volume of fluid displaced by the rod member 35 over the full compression stroke of the piston and rod assembly. This relationship provides highly acceptable performance for the monotube hydraulic damper 10.

Figure 6:
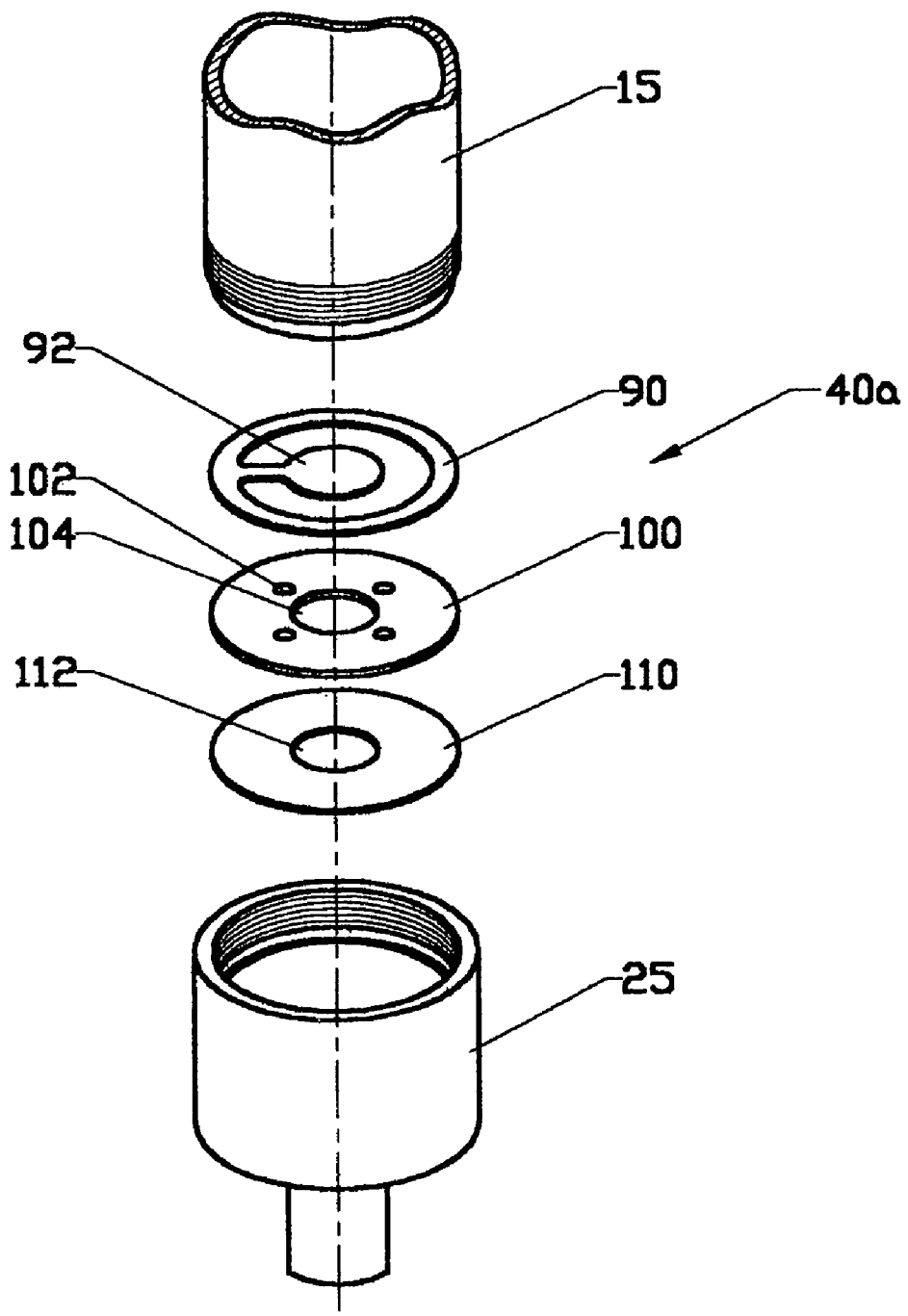
FIG. 6 is an exploded view of one embodiment of the base valve member of the non-pressurized monotube shock absorber assembly of the present invention.
Figure 7:
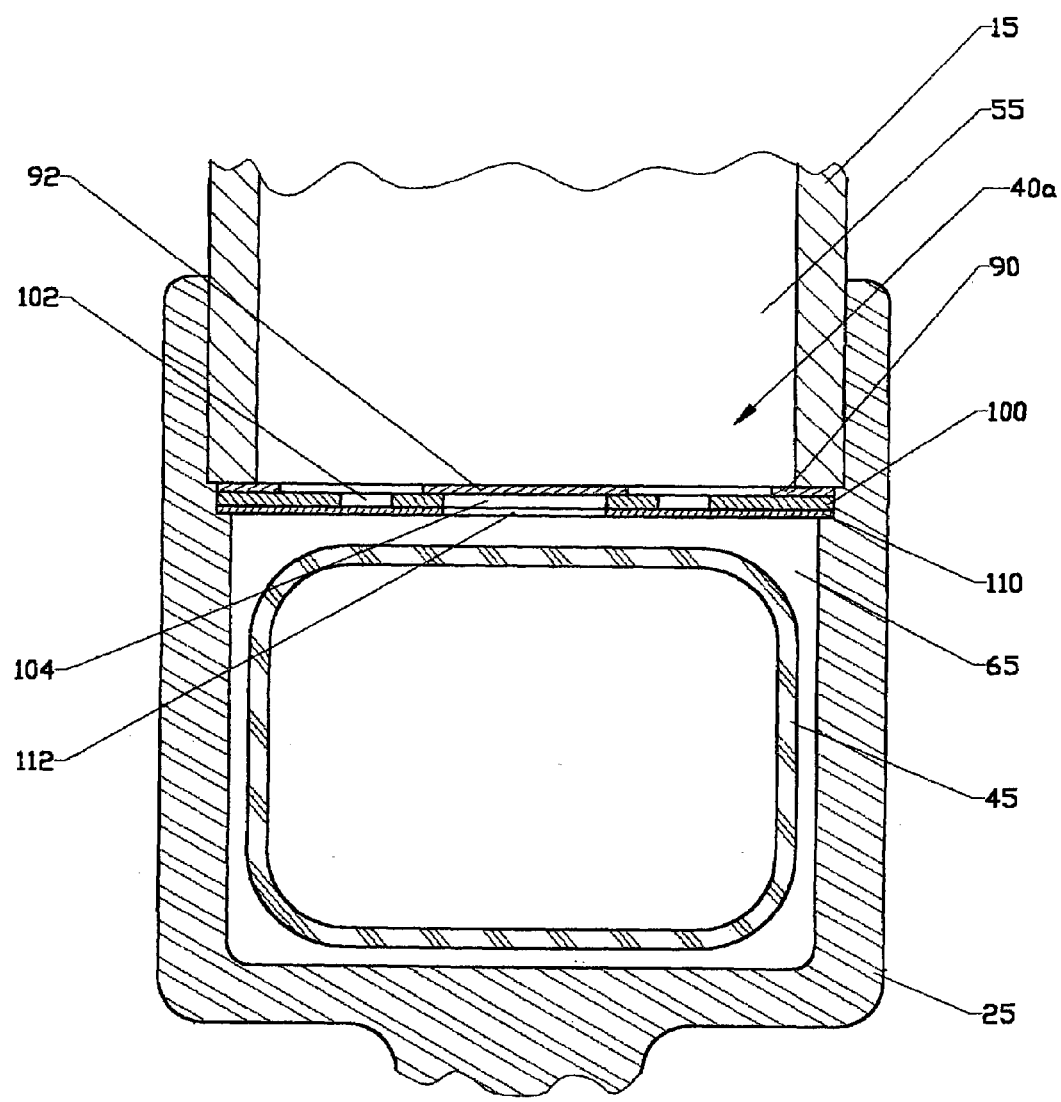
FIG. 7 is a cross sectional view of the assembled base valve member of FIG. 6 of the non-pressurized monotube shock absorber assembly of the present invention.

Referring now to FIG. 6, one embodiment of the base valve member 40 is shown in an exploded view. The base valve member 40 of the embodiment of FIG. 6 is a deflective disk assembly 40a adapted for regulating fluid flow between the compression chamber 55 and the compensation chamber 65. The deflective disk assembly 40a includes a stack of three plate members held in position at the connection between the tube body 15 and the base member 25. Preferably, the tube body 15 and base member 25 are fastened together by mating threads on each member. The three plate members 90, 100, 110 of the deflective disk assembly 40a are sized to fit within the base member 25 and held in position by the mating tube body 15, as illustrated in FIG. 6. The three plate members include a replenishing valve member 90 atop a valve plate member 100 positioned on a metering valve member 110, with the replenishing valve member 90 facing the compression chamber 55 and the metering valve member 110 facing the compensation chamber 65. The valve plate member 100 contains a central replenishing passage 104 in register with a similar replenishing passage 112 in the metering valve 110. The replenishing passages 104, 112 are covered by a replenishing flapper portion 92 of the replenishing valve member 90. The valve plate member 100 also contains a plurality of small metering passages 102 offset from the central replenishing passage 104. The metering passages 102 are unobstructed from the compression chamber 55 side but covered by the metering valve member 110 from the compensation chamber 65 side. During the compression stroke of the damper device 10, fluid from the compression chamber 55 flows through the metering passages 102 with sufficient pressure to deflect the metering valve member 110 and enter the compensation chamber 65, thereby compressing the compressible member therein. Fluid flow through the replenishing passages 104 into the compensation chamber 65 is prevented by the flapper portion 92 of the replenishing valve member 90 covering these passages. During the rebound stroke of the damper device 10, the flapper portion 92 of the replenishing valve member 90 allows fluid flow through the replenishing passages 104, 112 from the compensation chamber 65 to the compression chamber 55, thereby allowing expansion of the compressible member therein.

In the arrangements of the damper device 10 of the present invention, there is no need for a floating piston and pressurized gas, because the base valve member 40 provides the appropriate resistance to oil flow into the third compensation chamber 65, so that cavitation is avoided in the rebound chamber 50 during the compression stroke of the damper device 10. The base valve member 40 also allows oil to be replenished into the compression chamber 55 during the rebound stroke of the damper device 10. With the elimination of the floating piston and its wearable seal, the service life of the monotube hydraulic damper 10 of the present invention is expected to be greater. Also, since there is no sliding seal separating gas and oil phases, the internal surface of the tube body 15 may have a rougher surface finish, which reduces the cost of manufacture.

The descriptions above and the accompanying materials should be interpreted in the illustrative and not the limited sense. While the invention has been disclosed in connection with the preferred embodiment or embodiments thereof, it will be understood by those skilled in the art that various changes in form and details may be made therein without departing from the spirit and scope of the invention.

We claim:

1. A non-pressurized monotube hydraulic damper device comprising;
    a hollow, cylindrical tube body having a first end and a second end, with a rod guide member fixed at the first end of the tube body and a base member fixed at the second end of the tube body;
    a piston and rod assembly including a linear rod member passing slidingly and sealably through the rod guide member and secured at one end to a piston member slidingly and sealably positioned interior the tube body, the piston member dividing the tube body into a rebound chamber adjacent the rod guide member and a compression chamber adjacent the base member, the piston member including valving for fluid flow between the compression chamber and the rebound chamber;
    a base valve member mechanically fixed at the second of the tube body between the piston member and the base member, the base valve member dividing the compression chamber into a third chamber adjacent the base member, the base valve member regulating fluid flow between the compression chamber and the third chamber, the base valve member comprising a deflective disk assembly including a replenishing valve member atop a valve plate member positioned on a metering valve member, the valve plate member containing a central replenishing passage in register with a similar replenishing passage in the metering valve member, the replenishing valve member containing a replenishing flapper portion covering the central replenishing passage of the valve plate member, the valve plate member containing a plurality of metering passages offset and fluidly disconnected from the central replenishing passage of the valve plate member, the metering passages unobstructed on one side by the replenishing valve member and covered on another side by the metering valve member such that during a compression stroke fluid flow through the central replenishing passage of the valve plate member is prevented by the flapper portion of the replenishing valve member covering the central replenishing passage of the valve plate member; and
    a compressible member within the third chamber, the compressible member exerting essentially atmospheric pressure in an expanded condition.

2. The non-pressurized monotube hydraulic damper device of claim 1, further including a first mounting member secured to the base member exterior the tube body and a second mounting member secured to an end of the rod member exterior the tube body.

3. The non-pressurized monotube hydraulic damper device of claim 1, wherein the compressible member includes a sealed bladder member containing a gas at essentially atmospheric pressure.

4. The non-pressurized monotube hydraulic damper device of claim 1, wherein the compressible member includes a closed cell foam bladder member.

5. The non-pressurized monotube hydraulic damper device of claim 1, wherein the compressible member includes a fluid chamber adjacent the base member formed by a flexible diaphragm member secured at the second end of the tube body between the base valve member and the base member, the fluid chamber containing a gas at essentially atmospheric pressure.

6. The non-pressurized monotube hydraulic damper device of claim 1, wherein the expanded condition volume of the compressible member is about twice the volume of fluid displaced by the rod member over a full compression stroke of the piston and rod assembly.

7. A non-pressurized monotube hydraulic damper device comprising;
    a hollow, cylindrical tube body having a first end and a second end, with a rod guide member fixed at the first end of the tube body and a base member fixed at the second end of the tube body;
    a piston and rod assembly including a linear rod member passing slidingly and sealably through the rod guide member and secured at one end to a piston member slidingly and sealably positioned interior the tube body, the piston member dividing the tube body into a rebound chamber adjacent the rod guide member and a compression chamber adjacent the base member, the piston member including valving for fluid flow between the compression chamber and the rebound chamber;
    a base valve member mechanically fixed at the second of the tube body between the piston member and the base member, the base valve member dividing the compression chamber into a third chamber adjacent the base member, the base valve member regulating fluid flow between the compression chamber and the third chamber, the base valve member comprising a deflective disk assembly including a replenishing valve member atop a valve plate member positioned on a metering valve member, the valve plate member containing a central replenishing passage in register with a similar replenishing passage in the metering valve member, the replenishing valve member containing a replenishing flapper portion covering the central replenishing passage of the valve plate member, the valve plate member containing a plurality of metering passages offset and fluidly disconnected from the central replenishing passage of the valve plate member, the metering passages unobstructed on one side by the replenishing valve member and covered on another side by the metering valve member metering valve member such that during a compression stroke fluid flow through the central replenishing passage of the valve plate member is prevented by the flapper portion of the replenishing valve member covering the central replenishing passage of the valve plate member; and
    a compressible member within the third chamber, the compressible member exerting essentially atmospheric pressure in an expanded condition; and
    a first mounting member secured to the base member exterior the tube body and a second mounting member secured to an end of the rod member exterior the tube body.

8. The non-pressurized monotube hydraulic damper device of claim 7, wherein the compressible member includes a sealed bladder member containing a gas at essentially atmospheric pressure.

9. The non-pressurized monotube hydraulic damper device of claim 7, wherein the compressible member includes a closed cell foam bladder member.

10. The non-pressurized monotube hydraulic damper device of claim 7, wherein the compressible member includes a fluid chamber adjacent the base member formed by a flexible diaphragm member secured at the second end of the tube body between the base valve member and the base member, the fluid chamber containing a gas at essentially atmospheric pressure.

11. The non-pressurized monotube hydraulic damper device of claim 7, wherein the expanded condition volume of the compressible member is about twice the volume of fluid displaced by the rod member over a full compression stroke of the piston and rod assembly.

12. A non-pressurized monotube hydraulic damper device comprising;
- a hollow, cylindrical tube body having a first end and a second end, with a rod guide member fixed at the first end of the tube body and a base member fixed at the second end of the tube body;
- a piston and rod assembly including a linear rod member passing slidingly and sealably through the rod guide member and secured at one end to a piston member slidingly and sealably positioned interior the tube body, the piston member dividing the tube body into a rebound chamber adjacent the rod guide member and a compression chamber adjacent the base member, the piston member including valving for fluid flow between the compression chamber and the rebound chamber;
- a base valve member mechanically fixed at the second of the tube body between the piston member and the base member, the base valve member dividing the compression chamber into a third chamber adjacent the base member, the base valve member comprising a deflective disk assembly regulating fluid flow between the compression chamber and the third chamber, the deflective disk assembly including a replenishing valve member atop a valve plate member positioned on a metering valve member, the valve plate member containing a central replenishing passage in register with a similar replenishing passage in the metering valve member, the replenishing valve member containing a replenishing flapper portion covering the central replenishing passage of the valve plate member, the valve plate member containing a plurality of metering passages offset from the central replenishing passage, the metering passages unobstructed on one side by the replenishing valve member and covered on another side by the metering valve member metering valve member such that during a compression stroke fluid flow through the central replenishing passage of the valve plate member is prevented by the flapper portion of the replenishing valve member covering the central replenishing passage of the valve plate member; and
- a compressible member within the third chamber, the compressible member exerting essentially atmospheric pressure in an expanded condition, the expanded condition volume of the compressible member being about twice the volume of fluid displaced by the rod member over a full compression stroke of the piston and rod assembly; and
- a first mounting member secured to the base member exterior the tube body and a second mounting member secured to an end of the rod member exterior the tube body.

13. The non-pressurized monotube hydraulic damper device of claim 12, wherein the compressible member includes a sealed bladder member containing a gas at essentially atmospheric pressure.

14. The non-pressurized monotube hydraulic damper device of claim 12, wherein the compressible member includes a closed cell foam bladder member.

15. The non-pressurized monotube hydraulic damper device of claim 12, wherein the compressible member includes a fluid chamber adjacent the base member formed by a flexible diaphragm member secured at the second end of the tube body between the base valve member and the base member, the fluid chamber containing a gas at essentially atmospheric pressure.

* * * * *